(12) United States Patent
Chen

(10) Patent No.: US 6,489,953 B1
(45) Date of Patent: Dec. 3, 2002

(54) METHOD AND SYSTEM FOR GENERATING CRT TIMING SIGNALS IN A GRAPHICS ACCELERATOR

(75) Inventor: Douglas Chen, Santa Clara, CA (US)

(73) Assignee: Silicon Magic Corporation, Sunnyvale, CA (US)

( * ) Notice: Subject to any disclaimer, the term of this patent is extended or adjusted under 35 U.S.C. 154(b) by 0 days.

(21) Appl. No.: 09/464,331

(22) Filed: Dec. 15, 1999

(51) Int. Cl.[7] .................................................. G09G 5/00
(52) U.S. Cl. ........................ 345/213; 345/501; 345/503
(58) Field of Search ................................. 348/521–524; 345/10, 11, 213, 212, 501, 503, 520

(56) References Cited

U.S. PATENT DOCUMENTS 6,115,009 A * 9/2000 Ikegami ....................... 345/10
6,130,721 A * 10/2000 Yoo et al. .................... 348/524
6,157,376 A * 12/2000 Eglit ........................... 345/213

\* cited by examiner

*Primary Examiner*—Dennis-Doon Chow
(74) *Attorney, Agent, or Firm*—Sawyer Law Group LLP

(57) ABSTRACT

Aspects for generating CRT timing signals in a graphics accelerator are described. A method aspect includes shifting reference count values forward by a predetermined count period. A single comparator is utilized to perform a plurality of comparisons between CRT timing signals and at least one of the reference count values during the predetermined count period. Further, compensation for the shifting forward occurs by shifting back signals output from the single comparator. With the present invention, CRT timing signals are generated through time-shifting of relevant signals. The time-shifting further allows the utilization of a single comparator, which reduces the logic gate requirement and thus the area and cost.

16 Claims, 2 Drawing Sheets

METHOD AND SYSTEM FOR GENERATING CRT TIMING SIGNALS IN A GRAPHICS ACCELERATOR

FIELD OF THE INVENTION

The present invention relates to graphic accelerators, and more particularly to generating CRT timing signals in a graphics accelerator.

BACKGROUND OF THE INVENTION

Computer processing of 3D (three-dimensional) graphics can be considered as a three stage pipeline, comprising the general steps of tessellation, geometry, and rendering. The tessellation stage typically refers to the creation of a description of an object and the conversion of the description to a set of triangles. The geometry stage involves transformation, i.e., the scaling and rotation of the triangles, and lighting, i.e., the determination of the brightness, shading and texture characteristics of each triangle. The rendering stage involves the calculation of all attributes of the pixels forming the triangles, e.g., color, light, depth, and texture, and provides a two dimensional display from the triangles created in the geometry stage.

In the rendering stage, data is normally processed pixel by pixel. A rendering engine calculates all attributes of the pixel (color, light, depth, and texture) and must be able to process millions of polygons per scene and to construct a quality 2D (two-dimensional) representation in real time, for animation.

In displaying graphics data on a display device, such as a CRT device, a CRT controller is utilized to provide the display signals to the display device. FIG. 1 illustrates a prior art approach for providing CRT timing signals of horizontal synchronization (Hsync), vertical synchronization (Vsync), blanking, and display enable (Disp). A horizontal counter 100 provides a horizontal line/pixel count value and a vertical counter 102 provides a vertical line/pixel count value. Separate registers 104, 106, 108, 110, 112, 114, 116, and 118 store start and end count values for the timing signals Hsync, Vsync, blanking, and display enable. The horizontal count value from horizontal counter 100 is compared with the Hsync start and end times, blanking start and end times, and display start and end times from respective registers 104, 106, 112, 114, 116, and 118 via comparators 120, 122, 124, 126, 128, and 130. The vertical count value from vertical counter 102 is compared with the Vsync start and end times from registers 108 and 110 via the comparators 132 and 134. SR flips flops 136 are set and reset based on the comparison match signals generated from the comparators 120, 122, 124, 126, 128, 130, 132, and 134 to provide the desired signaling of Hsync, Vsync, blanking, and display enable. The use of separate comparators and registers for each start and end time ensures that timing signals, which need to be generated at the same count value, are capably produced from the conventional CRT timing signal generator. Unfortunately, the logic required for the multiple comparators and registers in this arrangement consumes a large silicon area.

Accordingly, a need exists for a technique for generating CRT timing signals that consumes less area than traditional techniques.

SUMMARY OF THE INVENTION

The present invention meets this need and provides aspects for generating CRT timing signals in a graphics accelerator. A method aspect includes shifting reference count values forward by a predetermined count period. A single comparator is utilized to perform a plurality of comparisons between CRT timing signals and at least one of the reference count values during the predetermined count period. Further, compensation for the shifting forward occurs by shifting back signals output from the single comparator.

With the present invention, CRT timing signals are generated through time-shifting of relevant signals. The time-shifting further allows the utilization of a single comparator, which reduces the logic gate requirement and thus the area and cost. These and other advantages of the present invention will be more fully understood in a conjunction with the following detailed description and accompanying drawings.

DETAILED DESCRIPTION OF THE INVENTION

The present invention relates to graphic accelerators, and more particularly to generating CRT timing signals in a graphics accelerator. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 2:
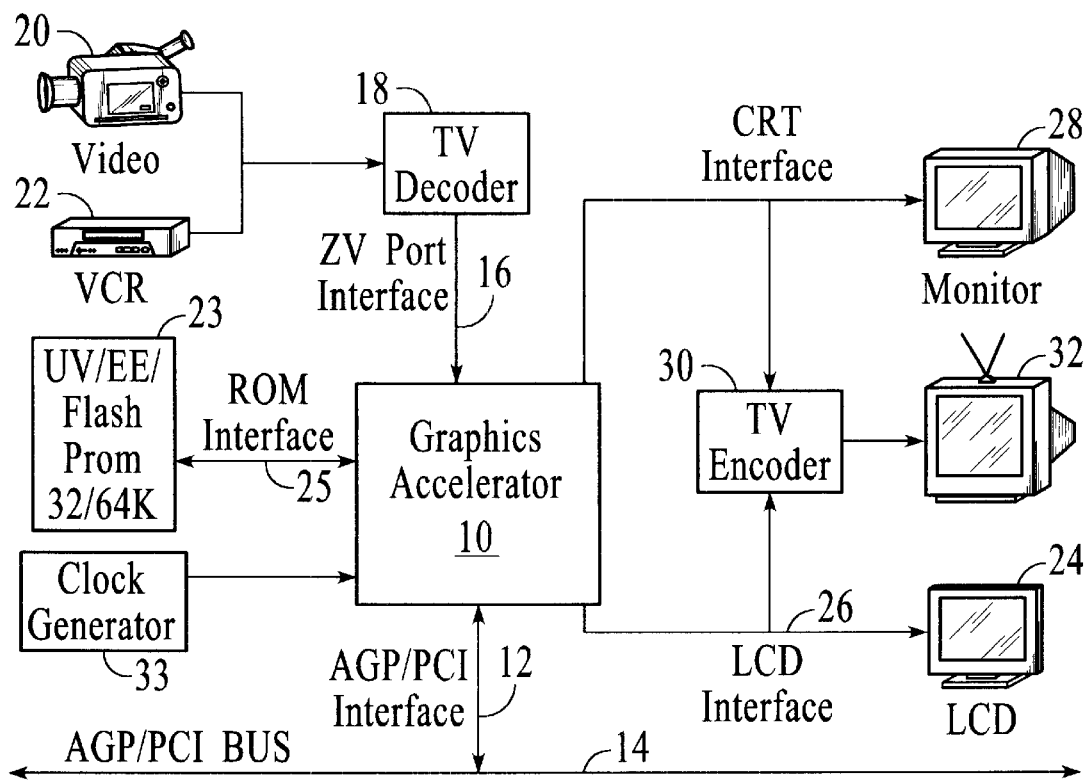
FIG. 2 illustrates a block diagram of an overall system environment within which the graphics accelerator 10 of the present invention is capable of use.

FIG. 2 illustrates a block diagram of an overall system environment within which a graphics accelerator 10 of the present invention is capable of use. The graphics accelerator 10 is an integrated graphics accelerator designed for high performance in a limited space environment, such as a laptop computer. The graphics accelerator 10 has a number of interfaces to accommodate a variety of configurations and devices.

A host interface 12 provides for a direct connection to either AGP or PCI buses 14. A zoom video input port (ZV port) 16 is provided to accept live video from a television (TV) decoder 18 in a computer system that is coupled to a external video source, such as a camcorder 20 or video recorder (VCR) 22. A single external crystal supplies reference clock timing to three independent programmable phase locked loops (PLLs), not shown. A BIOS ROM (basic input/output operating system read-only memory) port accesses a separate graphics ROM 23, if present, via ROM interface 25, or converts for output to a digital TV encoder if the separate graphics ROM is not present. The display outputs of the graphics accelerator 10 capably drive an LCD panel 24, e.g., DSTN or TFT panel, via an LCD interface 26, and drive a CRT (cathode ray tube) monitor 28, via a CRT interface, simultaneously. Either display port can connect to a TV encoder 30 for TV 32 display. DAC (digital-to-analog converter) and clock synthesizers (not shown) are also built-in to the graphics accelerator 10 to minimize the need for external components. A clock generator 33 is further coupled to the graphics accelerator 10 and provides a needed clock source.

Figure 3:
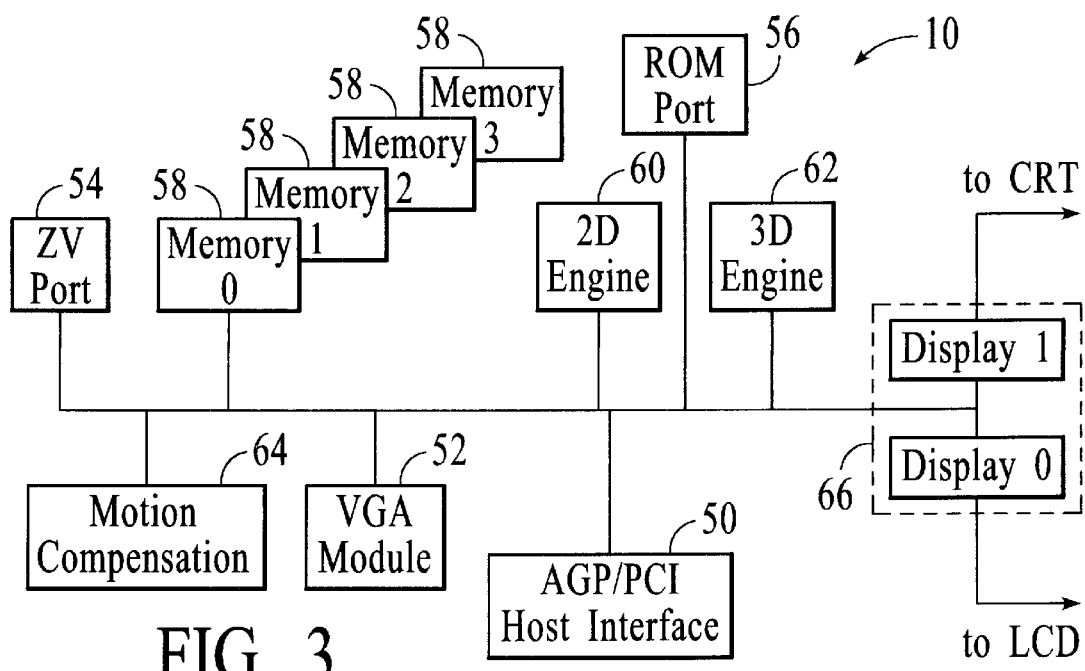
FIG. 3 illustrates an internal view of the graphics accelerator of FIG. 1 in block diagram form.

An internal view of the graphics accelerator 10 is illustrated in block diagram form in FIG. 3. The architecture includes a host interface 50, a VGA module 52, a zoom video port 54, a ROM port 56, four 1 MB (megabyte) modules of high performance embedded memory 58, a two-dimensional engine (2D engine) 60, a three-dimensional engine (3D engine) 62, a motion compensation module 64 for accelerating MPEG-2 playback, and dual display circuitry 66 to support single/simultaneous/dual display on any LCD panel/CRT monitor/TV combination.

The display subsystem 66 has two independent display pipelines. Each pipeline has its own enhanced CRT controller (CRTC), display FIFO, video FIFO, pixel unpacking circuit, color lookup table (CLUT), color keying circuit and scaler. The last stages of the two pipelines differ somewhat. Display pipeline 1 integrates a true color 230 MHz palette DAC with gamma correction. It can display 4, 8, 15, 16, 24, and 32 bpp (bits per pixel) with standard VGA, VESA and programmable enhanced display formats up to 1600 by 1200 resolution at 85 MHz. Display pipeline 0 is optimized for flat panel display with gamma correction and supports DSTN panels and TFT panels. Display 0 supports all standard VGA functions including all standard VESA display modes. Both displays support extended VESA modes for higher visual quality. The two enhanced CRT controllers can be set to display different data with different resolutions and refresh rates. Display 1 can accept display 0 data through a multiplexing circuit.

Figure 1:
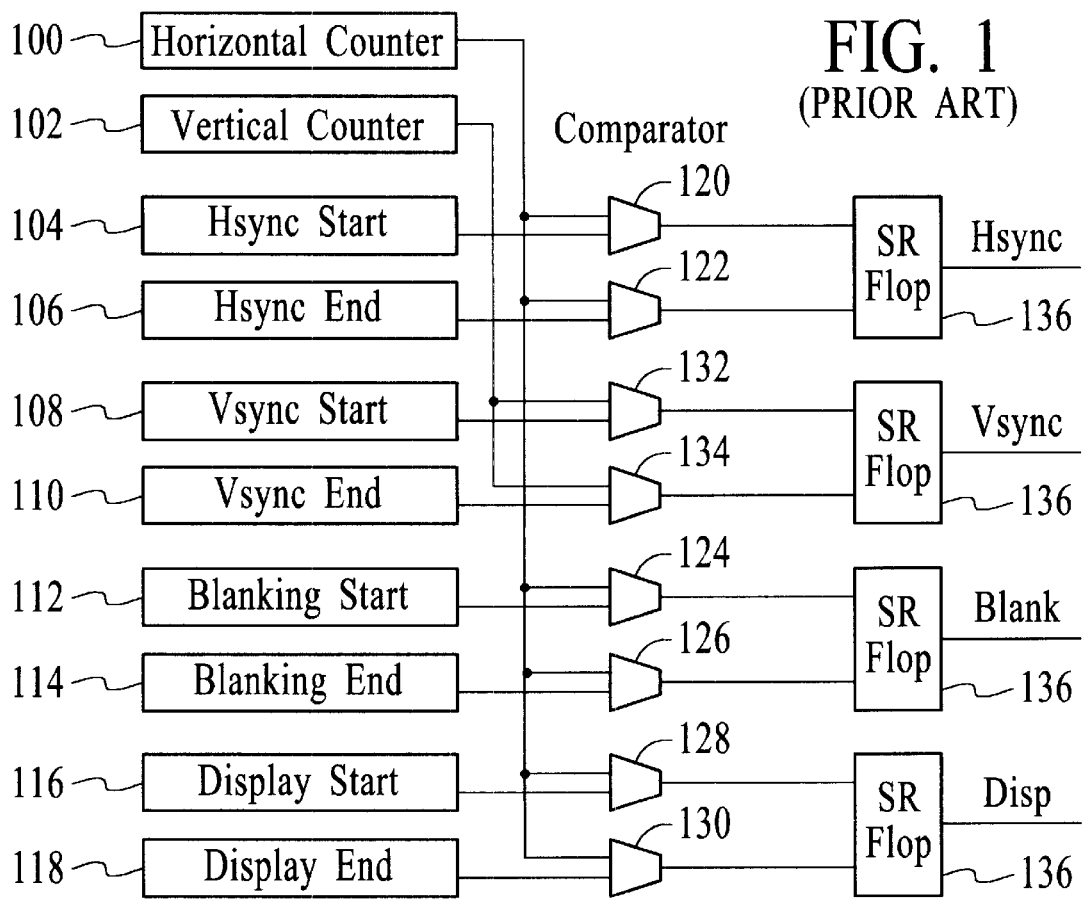
FIG. 1 illustrates a prior art approach for generating CRT timing signals.
Figure 4:
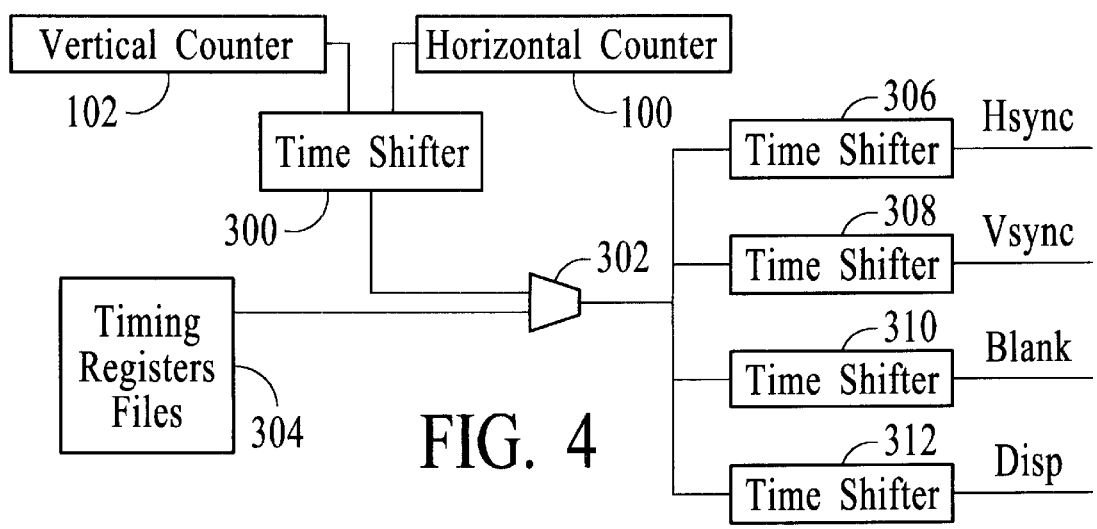
FIG. 4 illustrates CRT timing signal generation in accordance with the present invention.

In accordance with the present invention, the CRT timing signals from the CRT controller in at least one of the display pipelines are generated utilizing a single comparator. As shown in FIG. 4, the timing generator of the present invention includes a time shifter 300, a comparator 302, a memory device 304, and time shifters 306, 308, 310 and 312. In operation, the horizontal and vertical count values are time-shifted forward by a chosen count value via time shifter 300. The time shifting provides a period of time equal to the chosen count value within which separate comparisons can be performed via comparator 302. Thus, during the time-shifted period, the Hsync, Vsync, blanking, and display enable signal start and end times are retrieved and compared on a one-by one basis in comparator 302 with one comparison occurring with each clock cycle. Of course, the use of time shifting requires that the time at which the start and end of each signal occurs be time-shifted back to match the actual time. Thus, time shifters 306, 308, 310, and 312 shift the start and end signals back a particular amount of time based on the chosen count value shift forward and the cycle within which the comparison occurs.

By way of example, a time slot is chosen for one character clock cycle as equal to 8 pixel clocks. Suppose then that the following start and end times are desired.

Display Start: 0 character clock
Display End: 80 character clock
Blanking Start: 80 character clock
Blanking End: 125 character clock
Hsync Start: 82 character clock
Hsync End: 90 character clock
(Note that VESA defines all the timing signals with precision only up to the character clock level, as is well appreciated by those skilled in the art.)

Each character clock is divided into 8 time slots (i.e. one time slot equals one pixel clock period.)

$0^{th}$ time slot: compare display start
$1^{st}$ time slot: compare display end.
$2^{nd}$ time slot: compare blanking start.
$3^{rd}$ time slot: compare blanking end
$4^{th}$ time slot: compare hsync start
$5^{th}$ time slot: compare hsync end During the character clock period 0:
  Pixel clock 0: compared display start and found a match go to
  Time shifter (306) shift 8 pixel clocks
    (1 character clock) and set Disp to 1.
  Pixel clock 1: compared display end and found no match.
  Pixel clock 2: compared blanking start and found no match
  Pixel clock 3: compared blanking end and found no match
  Pixel clock 4: compared hsync start and found no match
  Pixel clock 5: compared hsync end and found no match
  Pixel clock 6,7: no operation needed; could be used for other signal comparison if needed.

During the character clock period 80:
  Pixel clock 0: compared display start and found no match.
  Pixel clock 1: compared display end and found a match go to
  Time shifter (306) shift 7 pixel clocks
    (because its time slot is 1, 8−1=7) and reset Disp to 0.
  Pixel clock 2: compared blanking start and found a match go to
  Time shifter (310) shift 6 pixel clocks
    (because its time slot is 2, 8−2=6) and set Blank to 1.
  Pixel clock 3: compared blanking end and found no match
  Pixel clock 4: compared hsync start and found no match
  Pixel clock 5: compared hsync end and found no match
  Pixel clock 6,7: do nothing In a similar manner, the determinations are checked through all the signals until horizontal signals end. Therefore we can get both display end and blanking start to happen on the same time, while doing the comparisons in different time slots. Of course, similar comparisons are performed to check Vsync start and end signals during separate time slots with the vertical count signal.

Thus, the present invention time slots the activity of a single comparator by time-shifting count signals forward and generates the CRT timing signals with compensation for the delay by appropriately time-shifting the output signals back. In this manner, fewer logic gates and correspondingly less area is required, which is highly desirable as system become more portable and more powerful.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for generating CRT timing signals in a graphics accelerator, the method comprising:
  shifting reference count values forward by a predetermined count period;
  utilizing a single comparator to perform a plurality of comparisons between CRT timing signals and at least one of the reference count values during the predetermined count period; and compensating for the shifting forward by shifting back signals output from the single comparator.

2. The method of claim 1 wherein shifting reference count values forward further comprises shifting horizontal and vertical count values.

3. The method of claim 2 wherein utilizing a single comparator further comprises performing one comparison per cycle.

4. The method of claim 2 wherein shifting reference count values further comprises shifting the reference count values by an eight cycle count period.

5. The method of claim 4 wherein utilizing further comprises performing eight comparisons with the single comparator during the eight cycle count period.

6. The method of claim 1 further comprising storing the CRT timing signals in an SRAM.

7. A system for generating CRT timing signals in a graphics accelerator, the system comprising:

a time shifter for shifting at least two reference count values forward by a predetermined count period;

a comparator coupled to the time shifter for performing a plurality of comparisons between CRT timing signals and at least one of the reference count values during the predetermined count period; and a plurality of time shifters coupled to the comparator for compensating for the shifting forward by shifting back signals output from the single comparator.

8. The system of claim 7 wherein the time shifter shifts the reference count values forward by a count period of eight cycles.

9. The system of claim 7 wherein the plurality of time shifters shift back output horizontal synchronization, vertical synchronization, blanking, and display enable signals.

10. The system of claim 7 further comprising a memory device coupled to the comparator for storing the CRT timing signals.

11. The system of claim 10 wherein the memory device further comprises an SRAM.

12. The system of claim 7 wherein the comparator performs one comparison per cycle.

13. A method for generating CRT timing signals in a graphics accelerator, the method comprising:

separating a character clock period into a plurality of time slots; and utilizing utilizing the time slots to clock comparisons by a single comparator between a reference signal and a timing signal, wherein the timing signal occurs during an appropriate character clock period; and wherein the utilizing step further comprises performing a comparison in each of two time slots between a reference horizontal count signal and a display start signal and a display end signal.

14. A method for generating CRT timing signals in a graphics accelerator, the method comprising:

separating a character clock period into a plurality of time slots; and utilizing the time slots to clock comparisons by a single comparator between a reference signal and a timing signal, wherein the timing signal occurs during an appropriate character clock period; and wherein the utilizing step further comprises performing a comparison in each of two time slots between a reference horizontal count signal and a blanking start signal and a blanking end signal.

15. A method for generating CRT timing signals in a graphics accelerator, the method comprising:

separating a character clock period into a plurality of time slots; and utilizing the time slots to clock comparisons by a single comparator between a reference signal and a timing signal, wherein the timing signal occurs during an appropriate character clock period; and wherein the utilizing step further comprises performing a comparison in each of two time slots between a reference horizontal count signal and an Hsync start signal and an Hsync end signal.

16. A method for generating CRT timing signals in a graphics accelerator, the method comprising:

separating a character clock period into a plurality of time slots; and utilizing the time slots to clock comparisons by a single comparator between a reference signal and a timing signal, wherein the timing signal occurs during an appropriate character clock period; and wherein the utilizing step further comprises performing a comparison in each of two time slots between a reference vertical count signal and a Vsync start signal and a Vsync end signal.

* * * * *